C. A. BACON.
LUBRICATING DEVICE.
APPLICATION FILED OCT. 27, 1915.
1,278,289.
Patented Sept. 10, 1918.
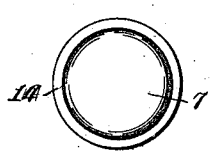
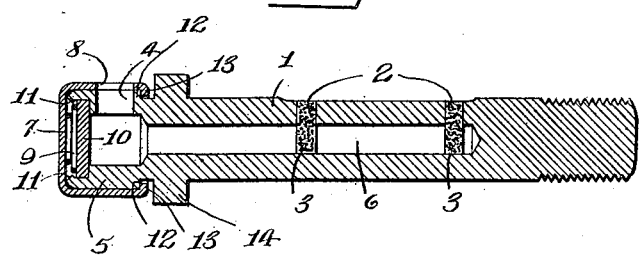
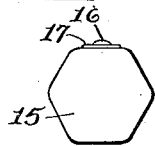
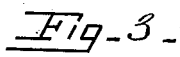
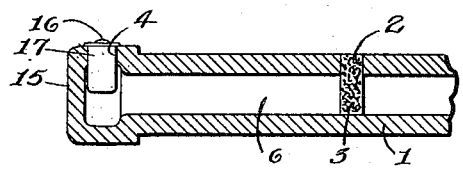
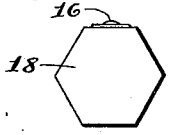
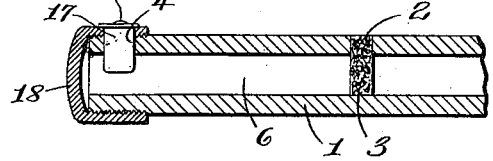
WITNESSES:
INVENTOR.
Chester A. Bacon.
BY Parsons+Bodell
ATTORNEYS.

UNITED STATES PATENT OFFICE.

CHESTER A. BACON, OF AUBURN, NEW YORK, ASSIGNOR TO GEORGE W. BOWEN, OF AUBURN, NEW YORK.

LUBRICATING DEVICE.

1,278,289.     Specification of Letters Patent.     Patented Sept. 10, 1918.

Application filed October 27, 1915. Serial No. 58,234.

*To all whom it may concern:*

Be it known that I, CHESTER A. BACON, a citizen of the United States, and a resident of Auburn, in the county of Cayuga and State of New York, have invented a certain new and useful Lubricating Device, of which the following is a specification.

This invention has for its object a lubricating device which is particularly simple and economical in construction and highly efficient and durable in use; and it consists in the novel features of construction hereinafter set forth and claimed.

In describing this invention, reference is had to the accompanying drawings, in which like characters designate corresponding parts in all the views.

Figure 1 is a longitudinal sectional view of a preferable form of this lubricating device.

Fig. 2 is an end view thereof.

Figs. 3 and 4 are views similar to Figs. 1 and 2 of another form of my invention.

Figs. 5 and 6 are views similar to Figs. 1 and 2 of a third form of this device.

This lubricating device comprises a hollow body having a filling opening near one end, and means for closing the opening. The lubricating device here illustrated is what is known as a spring bolt, and is used to connect one end of a spring of a vehicle to the frame of the vehicle, or to a shackle, or to another spring.

1 designates the hollow body which is here shown as in the form of a bolt, having transverse outlet holes 2 through which the lubricant feeds to the eye or bearing of the spring, these holes 2 being filled with wicks 3. The body 1 is also formed with a filling passage 4 located eccentric to its axis and near one end of the body, this passage 4 preferably extending transversely through the peripheral wall of the body.

As shown in Figs. 1 and 3, the body is formed with an integral head at one end, and the filling opening is formed in said head 5, and in Fig. 1 the passage 6 of the bolt opens through the outer end of the head, and in Fig. 3 said passage terminates short of the outer end wall of the head.

The means for closing the passage 4 comprises a cap 7 mounted on the end portion or head 5 of the body 1, and having an opening 8 for alinement with the filling opening 4, the cap 7 being preferably rotatable for moving its opening 8 into and out of alinement with the filling opening 4. The cap is also frictionally held from rotation by a spring tending to move the same axially in one direction to hold a friction surface thereof engaged, or slidably interlocked with, a complemental surface on the body 1 or the head 5 thereof.

9 is the spring which tends to move the cap 7 axially in one direction, this spring being located to press the cap outwardly, and being interposed between the inner face of the head thereof and a plug or washer 10 inserted in a countersink in the open end of the body 1. The edge of the circumferential wall of the countersink is pressed inwardly at 11 over the outer face of the plug, or washer 10, to hold the same in place, that is, to hold the same in the countersink.

The friction surface of the body 1 and the cap which are held engaged or slidably interlocked by the spring 9, are respectively, an annular face 12 on the rear face of the head 5, and the inner face of the inturned margin 13 at the open end of the cap 7, these faces being in planes extending at an angle to the axis of the bolt or body 1. Usually the body is provided with a flange 14 located near the head 5, and the margin 13 of the cap 7 is turned into the annular space or groove formed between said flange 14 and the head 5.

In Figs. 3 and 4, the body 1 is shown as formed with a head closed at 15 at its outer end and the filling opening is shown as provided with an ordinary spring-pressed oil check valve 16 located in the casing 17.

In Figs. 5 and 6, the cap 18 is shown as threaded on the open end of the body 1, and a valve 16 and casing 17 are located in the filling opening. In both the constructions shown in Figs. 3, 4 and 5, 6 the heads are formed with hexagonal peripheral surfaces.

In operation, oil may be filled into the interior of the body 1 by rotating the cap 7 until its opening 8 is alined with its opening 4 and thereafter again rotating the cap until the openings 8 and 4 are out of alinement, the spring 9 tending to hold the cap from unintentional rotation.

What I claim is:

1. A lubricating device comprising a hollow bolt having its passage opening through one end thereof, the bolt also having a transverse filling opening near the open end of the passage, and a cap for closing the open end of the passage, the cap having a circumferential wall inclosing the end portion of the bolt and formed with a passage for alinement with the transverse opening of the bolt, substantially as and for the purpose set forth.

2. A lubricating device comprising a hollow body, the passage of which opens through one end thereof, the body being formed with a transverse filling opening near the open end of the body, and a cap rotatably mounted on the bolt at the open end thereof, and having a perforation movable into and out of alinement with said opening, substantially as and for the purpose described.

3. A lubricating device comprising a hollow body, formed with a transverse filling opening therein near one end, a cap mounted on the body at said end and having a perforation movable into and out of alinement with the filling opening during the rotation of the cap, the body and the cap having interlocking portions, and a spring acting on the cap to hold said portions frictionally engaged, substantially as and for the purpose specified.

4. A lubricating device comprising a hollow body, the passage of which opens through one end thereof, the body being formed with a transverse filling opening therein, near the open end of the passage, a cap mounted on the body, and inclosing said open end and having a perforation movable into and out of alinement with the filling opening, the cap and the body having interlocking portions, a plug closing the open end of the passage, and a spring interposed between the plug and the top of the cap, substantially as and for the purpose described.

5. A lubricating device comprising a hollow body having its passage opening through one end thereof, the body being also formed with an annular shoulder near the open end of the body and with a transverse opening between the shoulder and the open end of the body, a cap rotatably mounted on the open end portion of the body and having its margin turned to slidably interlock with said shoulder, the cap being also formed with an opening in the peripheral wall thereof movable into and out of alinement with the filling opening, a plug for closing the open end of the body, and a spring interposed between the plug and the top of the cap, substantially as and for the purpose described.

6. A lubricating device comprising a hollow body formed with a cylindrical head at one end having a filling opening and a wrench hold at the base of the head, and a cap rotatably mounted on the head and having its margin turned inwardly between the end of the head and the wrench hold, the cap being formed with an opening movable into and out of alinement with the filling opening, substantially as and for the purpose set forth.

In testimony whereof I have hereunto signed my name, at Auburn, in the county of Cayuga and State of New York, this 24th day of Sept., 1915.

CHESTER A. BACON.

Copies of this patent may be obtained for five cents each, by addressing the "Commissioner of Patents, Washington, D. C."